Nov. 24, 1959 J. A. COOK, JR 2,914,750

ELECTRONIC STORAGE DEVICE

Filed Jan. 14, 1957

INVENTOR.
James A. Cook Jr.
BY
W. L. Stout
HIS ATTORNEY

United States Patent Office 2,914,750
Patented Nov. 24, 1959

2,914,750

ELECTRONIC STORAGE DEVICE

James A. Cook, Jr., Wilkinsburg, Pa., assignor to Westinghouse Air Brake Company, Wilmerding, Pa., a corporation of Pennsylvania Application January 14, 1957, Serial No. 634,000

9 Claims. (Cl. 340—173)

My invention relates to an electronic storage device, and more particularly to a device for storing a voltage so that the voltage may be made available at some later time.

For certain purposes it is frequently necessary to store, for a short time interval, a voltage which will be used at some later time. Such is the case in certain process control circuits where during certain steps of the process a signal is developed which must be retained until some later step when the signal is to be used. Inasmuch as it is possible to derive the signal only during the earlier step, it is necessary to provide a means which will accept the signal and retain it with a high degree of accuracy until the subsequent step. The means for retaining the signal is referred to herein as a storage means or device and the signal or voltage being stored is referred to as the information being stored.

It is therefore, an object of my invention to provide a storage device for storing an electrical signal.

Another object of my invention is to provide a storage device which will provide storage of signals of the continuous or analog variety.

A further object of my invention is to provide a storage device which is made substantially free from inherent variations in the components from which the device is composed in order that such variations will have substantially no effect upon the accuracy of the device.

In carrying out my invention, I employ a capacitor, an amplifying means and a suitable switching means. The capacitor is initially connected to the input circuit of the amplifying means in such a manner that it is charged by a voltage that is provided, in part, by the signal voltage which it is desired to store and, in part, by a voltage derived from the amplifying means. After the capacitor has been fully charged the switching means connects the capacitor to the amplifying means in a manner to provide a feedback path between the input circuit and the output circuit of the amplifying means. Under these conditions the output voltage of the amplifying means will be substantially equal to the voltage of the signal which it is desired to store. Means is further provided for connecting the output circuit of the amplifier, at the end of the storage interval, to the load where the stored information is to be used.

Other objects of my invention and features of novelty thereof will become apparent from the following specification taken in connection with the accompanying drawings.

Figure 1:
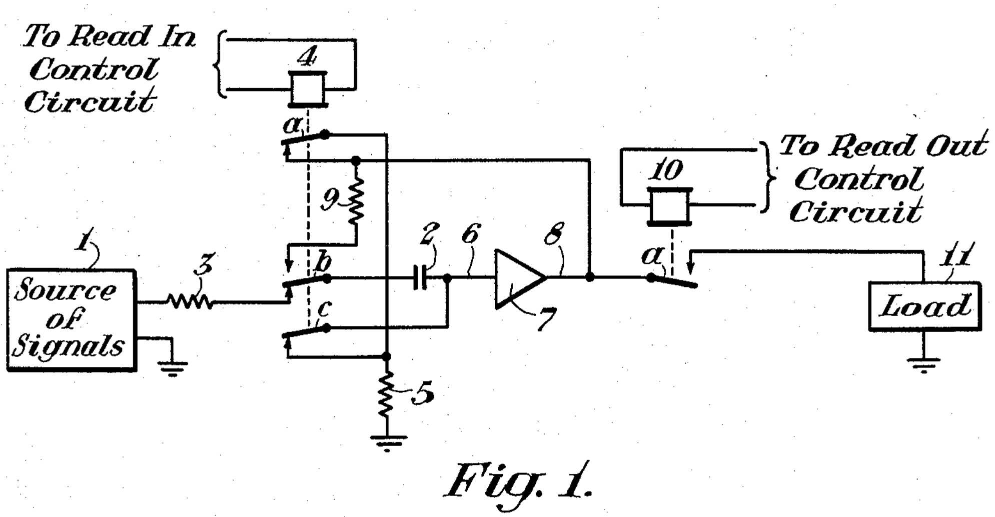

Fig. 1 of the accompanying drawings is a diagrammatic view of a storage device embodying my invention.

Figure 2:
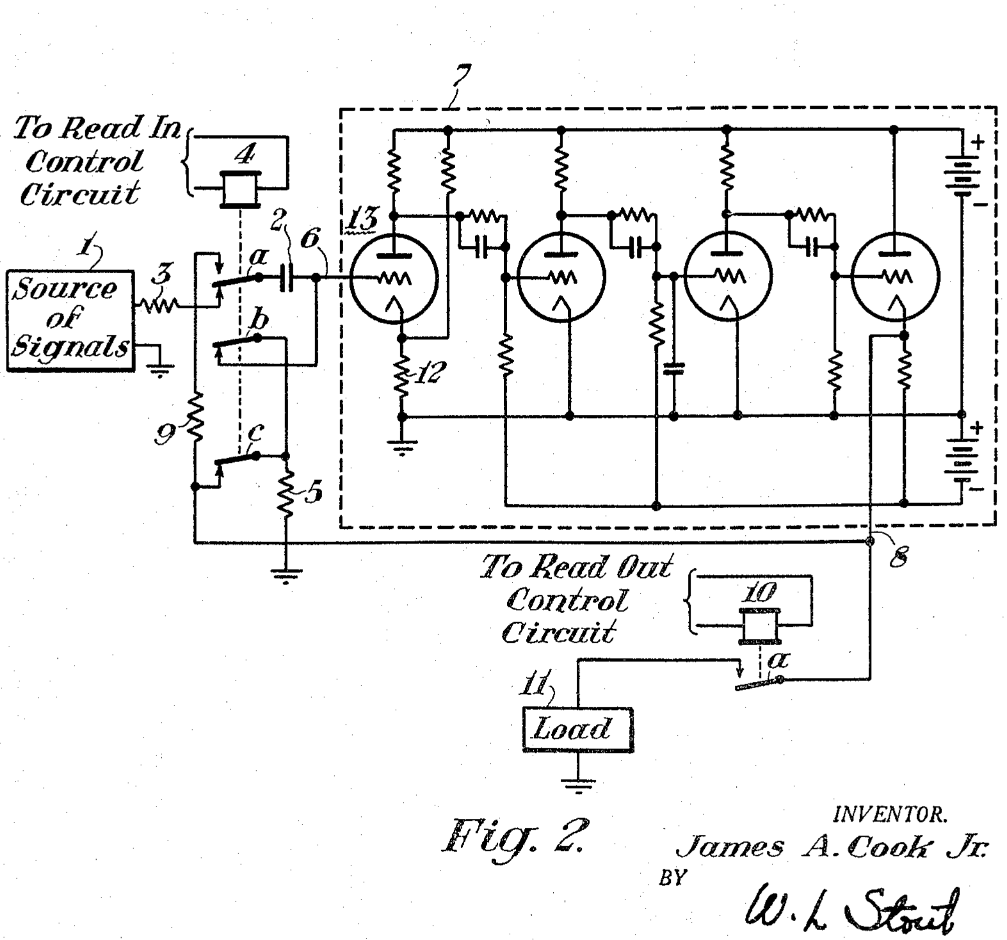

Fig. 2 is a diagrammatic view of a storage device embodying my invention including an amplifier which has been constructed and found to operate satisfactorily in connection with the storage device of my invention.

Similar reference characters will refer to similar parts in each of the several views.

Referring now to Fig. 1, I have here shown a source of signals 1 which provides a signal or voltage containing the information which it is desired to store. The source of signals is connected to a capacitor 2 through a circuit starting at an output terminal of the source of signals and passing through a first resistor 3, a back contact *b* of a relay 4, capacitor 2, a second back contact *c* of relay 4 and a resistance 5 to ground. The ground connection of resistor 5 is common to the ground of the source of signals to form a return path for the source of signals. The junction between the capacitor and the second back contact *c* of the relay is connected to an input terminal 6 of a suitable amplifier 7, the function of which will soon be explained. When the relay is deenergized, an output terminal 8 of the amplifier is connected through a back contact *a* of the relay to the junction of resistor 5 and back contact *c* to form a first feed-back circuit for the amplifier. Resistor 5 is thereby connected in shunt with both the input and the output circuits of the amplifier, the reason for which will be made clear hereinafter.

The output terminal 8 of the amplifier is connected to one end of a resistor 9 and the other end of the resistor is connected to the front contact *b* of the relay to form a second feed-back circuit which includes the capacitor, whenever relay 4 is energized.

Relay 4 is controlled by a read-in control circuit (not shown) which is so arranged that the relay is deenergized when a voltage to be stored is being developed by the source of signals and is energized subsequently so that the stored information may be retained for use at some later interval.

Amplifier 7 may be of any suitable design and one amplifier circuit which has been constructed and found to operate satisfactorily is shown in Fig. 2, which will be described later. Inasmuch as the voltage which it is usually desired to store is of the unidirectional variety, it is necessary to employ an amplifier capable of amplifying direct current voltages. Amplifiers of this type are usually subject to inherent instabilities such as drift and the like. One of the novel features of my invention is the use of the associated amplifier in such a way as to reduce to a very low degree the effect of such instabilities insofar as my storage device is concerned, thereby providing a storage device having a high degree of accuracy.

The operation of my storage device is as follows. When relay 4 is deenergized the source of signals is connected to capacitor 2 so that current flows from the source of signals through resistance 3, capacitor 2 and resistor 5 to charge the capacitor. Resistors 3 and 5 are so chosen that the capacitor charges quickly. It will be noted that, simultaneously, the input circuit and output circuit of the amplifier are connected together and shunted by resistor 5 and, in accordance therewith, a voltage will be developed at the output circuit according to the internal characteristics of the amplifier. This voltage will appear across resistor 5. The polarity of this voltage may be either similar or opposite to that provided by the source of signals. If these voltages are of opposite polarity, capacitor 2 will be charged to a voltage equal to the sum of the two voltages whereas, if the voltages are of the same polarity, the capacitor will be charged to a voltage equal to the difference between the two voltages. In any event, the capacitor is charged to a voltage which differs from the voltage of the source of signals by the voltage developed across resistor 5. It will be seen later, however, that the voltage obtainable from the storage device during the read-out interval will be substantially equal to that which was being supplied by the source of signals while the capacitor was being charged.

After the capacitor has been fully charged relay 4 is energized by the read-in control circuit. The energizing of the relay causes its back contact *a* to be open which removes the connection between the output circuit and the input circuit of the amplifier. The opening of back contact *c* disconnects resistor 5 from the input circuit, and the opening of back contact *b* disconnects the source of signals from the input circuit of the amplifier. The closing of front contact *b* connects resistor 9 and capacitor 2 in series between the input circuit and the output circuit to form a feed-back path around the amplifier. Inasmuch as resistor 9 has a relatively high resistance and the amplifier is arranged to have negligible current flowing in the input terminal, the capacitor remains in the charged state for a relatively long period of time. It is during this time interval that the information is stored in the storage device in accordance with my invention.

At the end of the time interval that it is desired to retain the information a second relay 10 is energized by a read-out control circuit, the arrangement of which is not shown since it forms no part of my present invention. The read-out control circuit merely functions to energize relay 10 at such time as it is desired to use the information which was stored in the storage device.

The energizing of relay 10 closes a front contact *a* which connects the output terminal 8 of the amplifier to the apparatus where the stored information is to be used. Since the apparatus which uses the stored information may be arranged in a number of different forms depending upon the manner in which the information is to be used and since the particular arrangement forms no part of my present invention, the apparatus is shown in block form labeled load designated by the reference character 11.

When relay 10 is energized the output circuit of the amplifier is connected to the load and the voltage impressed upon the load is substantially equal to the voltage which was developed by the source of signals during the time that the capacitor was being charged, as will be shown later. After the stored voltage or information has been delivered to the load, relays 4 and 10 may be deenergized to prepare the apparatus for another storage.

Referring now to Fig. 2, there is shown an amplifier which may be used in connection with my storage device and which has been constructed and found to operate satisfactorily. Inasmuch as the amplifier may be arranged in a plurality of ways and yet operate in accordance with my invention I will merely point out those features which should be taken into consideration in the design and construction of an amplifier for use in connection with my invention.

When relay 4 is deenergized, the input circuit and output circuit of the amplifier are connected together and shunted by resistor 5. Under these conditions the voltage across the input circuit and the output circuit of the amplifier must be identical. The voltage across the input circuit is the sum of the voltages between the grid and cathode electrodes of tube 13 and the voltage across the cathode resistor 12 of tube 13, assuming the source of signals is not providing a voltage at this time. Since the output voltage of the amplifier which is the voltage existing between terminal 8 and ground is equal to the voltage between the grid and cathode electrodes of tube 13 multiplied by the overall forward gain of the amplifier, and since the forward gain is relatively high, the grid to cathode voltage of tube 13 is relatively low. This voltage is sufficiently low so that it may be considered zero with respect to the voltage across cathode resistor 12. Thus it is seen that under these conditions the input voltage and output voltage of the amplifier are substantially equal to the voltage across cathode resistor 12. The forward gain of the amplifier as referred to above refers to the gain of the amplifier when all feed-back paths are open circuited. With the circuit connected in this manner there is 100 percent degenerative feed-back around the amplifier since there is 180° phase shift through the amplifier. That is, any change in the input voltage is amplified by the forward gain of the amplifier and is applied to the output circuit and thus, in turn, to the input circuit with 180° phase shift with respect to the change in the input voltage. Thus the amplifier will be extremely stable and substantially independent of drift or fluctuations within the amplifier.

As mentioned previously, the output voltage of the amplifier will be substantially equal to the voltage developed across resistor 12 in the cathode circuit of tube 13. If the source of signals provides a signal or voltage that is positive with respect to ground, capacitor 2 will be charged to the voltage approximately equal to the difference between the voltage of the source of signals and the output voltage of the amplifier which is the voltage across resistor 12. When the capacitor is switched to the feed-back circuit due to the energizing of relay 4 by the read-in control circuit, the capacitor will retain the charge for a relatively long period of time. Resistor 9 is chosen to be relatively large and tube 13 of the first amplifying stage and its asociated circuitry is chosen to have negligible grid to cathode current in order that the discharge path for the capacitor be of high resistance and that the capacitor discharges very slowly.

With the capacitor connected in the feed-back loop, the output voltage of the amplifier is equal to the sum of the voltage across the capacitor plus the voltage existing between the grid and cathode electrodes of tube 13 and the voltage across resistor 12. The grid to cathode voltage of tube 13 cannot change materially due to the high forward gain of the amplifier as described previously and, accordingly, the grid to ground voltage of tube 13 remains substantially equal to the voltage across resistor 12. Thus the amplifier output voltage is substantially equal to the voltage across the capacitor and the grid voltage across the cathode resistor 12. Inasmuch as the capacitor was originally charged to a voltage which differs from the voltage which it is desired to store by the voltage existing across resistor 12, the amplifier output voltage will now be substantially equal to the voltage which it is desired to store.

Thus it is seen that the invention provides a convenient device for storing electrical data for relatively long periods of time with a high degree of accuracy. The invention includes means for charging a capacitor with a voltage representative of the information to be stored compensated by a voltage representative of the inherent characteristics of the associated amplifier. The capacitor is then switched to a feed-back path for the amplifier in such a manner that the output voltage from the amplifier is made substantially equal to the voltage representing the electrical information which it is desired to store. The arrangement thereby provides a storage device that is practically immune from inherent instabilities in its associated amplifier. Thus, my invention provides a convenient and stable means for storing electrical information.

While I have herein shown and described only one form of device for storing electrical signals embodying my invention, it is to be understood that various changes and modifications may be made therein within the scope of the appended claims without departing from the spirit and scope of my invention.

Having thus described my invention, what I claim is:

1. Means for storing an electrical signal comprising, a capacitor, amplifying means, means for connecting the input circuit to the output circuit of said amplifying means to develop a voltage across said output circuit having a magnitude corresponding to the internal characteristics of said amplifying means, means for charging said capacitor in accordance with the voltage level of the signal voltage and said voltage developed across said output circuit, and means for connecting said capacitor to said amplifying means to provide an output voltage which is representative of the voltage level of said electrical signal.

2. Means for storing an electrical signal comprising a capacitor, amplifying means, resistive means, switching means having a first position for connecting the input circuit and output circuit of said amplifying means to said resistive means and for connecting said capacitor to said input circuit and having a second position for breaking the connection between said input circuit, said output circuit and said resistive means and for connecting said capacitor in a feedback circuit for said amplifying means, and means for charging said capacitor when said switching means is in said first position.

3. Means for storing an electrical signal comprising a capacitor, amplifying means, means connecting the input circuit and output circuit of said amplifying means to develop a voltage across said input circuit which is representative of the inherent characteristics of said amplifying means, means for charging said capacitor to a voltage differing from the voltage of said electrical signal by said voltage across said input circuit, and means for breaking the connection between said input circuit and said output circuit and for connecting said capacitor in a feedback path for said amplifying means.

4. In combination with a source for producing an electrical signal, a storage device comprising a capacitor, amplifying means, resistive means connecting the input circuit and output circuits of said amplifying means, means for charging said capacitor to a voltage differing from the voltage of said electrical signal by the voltage existing across said resistive means, and means for disconnecting said input circuit and said output circuit from said resistive means and for connecting said capacitor in a feedback path for said amplifying means.

5. In combination with a source for producing an electrical signal, a storage device comprising a capacitor, amplifying means, resistive means coupling the input circuit and the output circuits of said amplifying means, means for charging said capacitor to a voltage differing from the voltage of said electrical signal by the voltage existing across said resistive means, a second resistive means, and means for disconnecting said input circuit and said output circuit from said resistive means and for connecting said capacitor and said second resistive means in a feedback circuit for said amplifying means.

6. In combination with a source for producing an electrical signal, a storage device comprising a capacitor, amplifying means, a resistive network coupling the input circuit and the output circuit of said amplifying means, means for connecting said capacitor to said source and said resistive network to charge said capacitor to a voltage differing from the voltage of said electrical signal by the voltage existing across said resistive network, and means for disconnecting said network from said input circuit and said output circuit and for connecting said capacitor in a feedback path for said amplifying means.

7. In combination with a source for producing an electrical signal, a storage device comprising a capacitor, amplifying means, a resistive element, means connecting said resistive element to the input circuit and output circuit of said amplifying means, means for connecting said capacitor to said source and said resistive means to charge said capacitor to a voltage differing from the voltage of said electrical signal by the voltage existing across said resistive element, and means for disconnecting said input circuit and said output circuit from said element and for connecting said capacitor in a feedback path for said amplifying means.

8. In combination with a source for producing an electrical signal, a storage device comprising a capacitor, amplifying means, a resistive element, means connecting said resistive element to the input circuit and the output circuit of said amplifying means, means for connecting said capacitor to said source and said resistive means to charge said capacitor to a voltage differing from the voltage of said electrical signal by the voltage existing across said resistive element, means for disconnecting said input circuit and said output circuit from said element and for connecting said capacitor in a feedback circuit for said amplifying means, and means for connecting said output circuit to a load when it is desired to read out the information stored in said storage device.

9. Means for storing an electrical signal comprising a capacitor, a high gain amplifying means, a resistive element, means for connecting said resistive element to the input circuit and the output circuit of said amplifying means, means for connecting said capacitor to said source and to said resistive element to charge said capacitor to a voltage differing from the voltage of said signal by the voltage existing across said resistive element, and means for disconnecting said input circuit and said output circuit from said element and for connecting said capacitor in a feedback path for said amplifying means.

References Cited in the file of this patent

UNITED STATES PATENTS

| | | |
|---|---|---|
| 2,564,062 | Herrick | Aug. 14, 1951 |
| 2,691,728 | Noble | Oct. 12, 1954 |
| 2,760,134 | Johnson | Aug. 21, 1956 |